(12) United States Patent
Keding

(10) Patent No.: US 11,731,497 B2
(45) Date of Patent: Aug. 22, 2023

(54) APPARATUS FOR LOCKING A TRUCK COVER AGAINST UNAUTHORIZED RELEASE

(71) Applicant: Martin Keding, Ile Des Chenes (CA)

(72) Inventor: Martin Keding, Ile Des Chenes (CA)

( * ) Notice: Subject to any disclaimer, the term of this patent is extended or adjusted under 35 U.S.C. 154(b) by 0 days.

(21) Appl. No.: 17/697,113

(22) Filed: Mar. 17, 2022

(65) Prior Publication Data

US 2022/0388381 A1 Dec. 8, 2022

Related U.S. Application Data

(60) Provisional application No. 63/195,981, filed on Jun. 2, 2021.

(51) Int. Cl.
*B60J 7/185* (2006.01)
*B60J 7/19* (2006.01)

(52) U.S. Cl.
CPC .............. *B60J 7/185* (2013.01); *B60J 7/198* (2013.01)

(58) Field of Classification Search
CPC ... B60J 7/198; B60J 7/185; B60J 7/102; B60J 7/104; B60J 7/141
See application file for complete search history.

(56) References Cited

U.S. PATENT DOCUMENTS

| | | | |
|---|---|---|---|
| 7,537,264 B2 * | 5/2009 | Maimin | B60P 7/02 296/100.09 |
| 8,857,887 B1 * | 10/2014 | Schmeichel | B60P 7/04 296/100.18 |
| 10,189,339 B2 * | 1/2019 | Williamson | B60J 7/141 |
| 10,189,340 B2 * | 1/2019 | Schmeichel | B60J 7/198 |
| 10,286,765 B2 * | 5/2019 | Williamson | B60P 7/00 |
| 10,500,934 B1 * | 12/2019 | Weng | B60J 7/1858 |
| 11,097,605 B2 * | 8/2021 | Mahler | B60J 7/19 |
| 11,186,151 B1 * | 11/2021 | Xu | B60J 7/198 |
| 2006/0090527 A1 * | 5/2006 | Terhaar | E05B 79/20 70/279.1 |
| 2021/0053427 A1 * | 2/2021 | Gu | B60J 7/141 |
| 2021/0114446 A1 * | 4/2021 | Schmeichel | B60J 7/141 |
| 2021/0122219 A1 * | 4/2021 | Mahler | B60J 7/19 |
| 2022/0234429 A1 * | 7/2022 | Mantovani | B60J 7/198 |

\* cited by examiner

*Primary Examiner* — Jason S Morrow
(74) *Attorney, Agent, or Firm* — Adrian D. Battison; Ade & Company Inc.; Kyle R. Satterthwaite

(57) ABSTRACT

An apparatus is provided for locking a truck cover against unauthorized release, where the truck cover has a latching device attached to the underside including a pull cable exposed at an opening to be manually pulled to release the latch projection. The apparatus provides a housing to engage over the opening and a rotatable actuator that engages the cable with a manually operable handle which is located on the side of the latch facing away from the end edge so as to be inaccessible until the tail gate is opened.

20 Claims, 5 Drawing Sheets

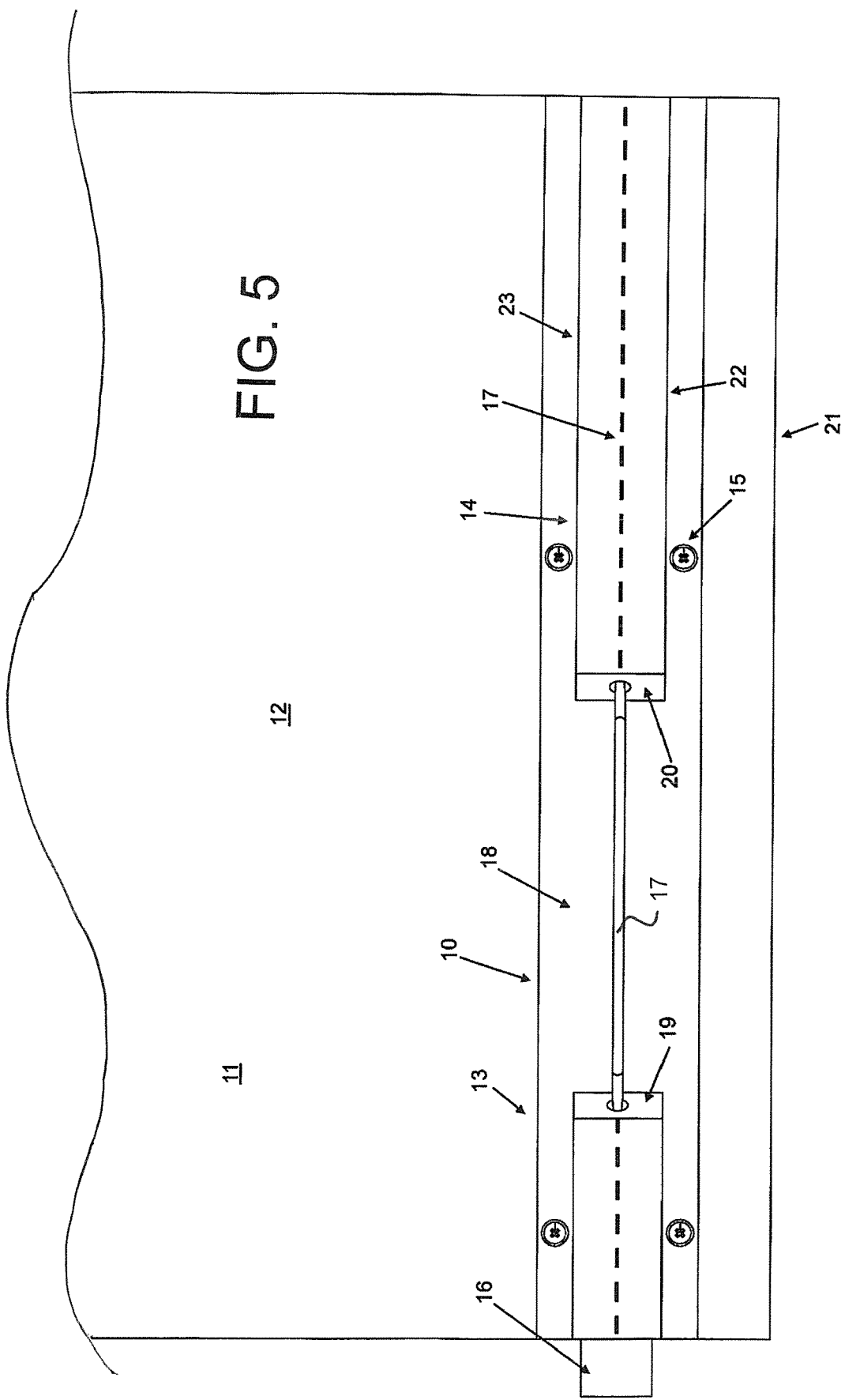

APPARATUS FOR LOCKING A TRUCK COVER AGAINST UNAUTHORIZED RELEASE

This application claims the benefit under 35 USC 119 (e) of Provisional application 63/195,981 filed Jun. 2, 2021.

This invention relates to an apparatus for locking a truck cover against unauthorized release.

BACKGROUND OF THE INVENTION

Truck box covers are provided and widely used which include a cover panel which is arranged to extend over a truck box and a latching device attached to an underside of the cover panel. The latching device typically includes a transverse receptacle or channel containing a pull cable attached to a latch projection for engaging a member on the side wall of the truck box to prevent forward or rearward movement of the cover panel relative to the truck box. The transverse receptacle has an opening, and typically two spaced openings, at which a portion of the cable is exposed to be manually pulled to release the latch projection. The channel containing pull cable is located adjacent an end edge of the cover panel. The intention is that the cover panel hides the pull cable so that it can only be pulled when the locked tailgate is open allowing access through the tailgate opening to the underside of the cover spaced away from the edge. In this way it is considered that the cover is locked by the locked tailgate. However brief experimentation will show that a simple hook can be inserted under the rear edge of the cover to the cable allowing the cable to be pulled and the cover latches opened.

A number of different designs are available from different manufacturers where the channel or elongate receptacle which houses the cable and the end latches are of different designs and different mounting. However the basic principle is the same in each case and none provides any arrangement which would prevent the potential thief from entering the truck box by pulling the latches where the cable is exposed.

SUMMARY OF THE INVENTION

It is an object of the present invention to provide an apparatus for locking a truck cover against unauthorized release.

According to the invention there is provided an apparatus for locking a truck cover against unauthorized release, where the truck cover comprises:

a cover panel which is arranged to extend over a truck box up to a tailgate of the truck box and which can move from a closed position at the tailgate away from the tailgate;

and a latching device attached to an underside of the cover panel including a transverse receptacle containing a pull cable attached to at least one latch projection for engaging a side member on the truck box to prevent movement of the cover panel relative to the truck box from the closed position, the transverse receptacle having an opening at which a portion of the cable is exposed to be manually pulled to release said at least one latch projection, the transverse receptacle being located adjacent a rear edge of the cover panel with a side of the transverse receptacle facing away from the rear edge;

the apparatus comprising:

a housing shaped to engage over the opening in the transverse receptacle;

an actuator mounted on the housing and movable relative thereto;

the actuator engaging the cable so that movement of the actuator operates to pull the cable to release said at least one latch projection;

the actuator including a manually operable member located such that it becomes accessible only from underneath the cover panel when the tailgate is opened;

the housing and the actuator cooperating to cover the opening in the transverse receptacle so as to prevent direct access to the cable and thereby prevent unauthorized release of the latch projection by pulling of the portion of the cable.

Preferably the actuator is mounted for rotation to pull the cable typically about an axis at right angles to the cover panel. This makes it very difficult for the rotation to be effected by a tool inserted from the rear edge of the cover.

Preferably therefore the manually operable member comprises a handle lever which extends rearwardly away from the end edge making it difficult to reach and to operate.

In this way, the manually operable member is located such that it becomes accessible only from underneath the cover panel when the tailgate is unlocked and opened.

In order to properly hold and pull the cable, preferably the actuator includes a guide channel into which the cable is inserted. The guide channel preferably has ends lying on a path of the cable and a center portion which extends to one side of a center axis of the actuator so as hold the cable taut where the cable guide channel lies in a common plane with the transverse receptacle. This arrangement properly locates and covers the cable while allowing a simple rotation of the actuator to pull the cable to actuate the latch.

In order to properly locate and hold the cable on either side the actuator, preferably the housing includes a cable engagement portion which holds the cable fixed on at least one side of the actuator and more preferably includes two cable engagement portions each on a respective side of the actuator which holds the cable fixed on the side of the actuator.

Preferably the housing is fastened to the cover panel at sides of the transverse receptacle so as to extend over or bridge the transverse receptacle which remains in place on the underside of the cover panel.

Preferably ends of the housing engage over and cover ends of the transverse receptacle at the opening.

BRIEF DESCRIPTION OF THE DRAWINGS

One embodiment of the invention will now be described in conjunction with the accompanying drawings in which:

FIG. 5 is an underside view of the conventional locking system of FIG. 1 with the apparatus omitted.

In the drawings like characters of reference indicate corresponding parts in the different figures.

DETAILED DESCRIPTION

Figure 1:
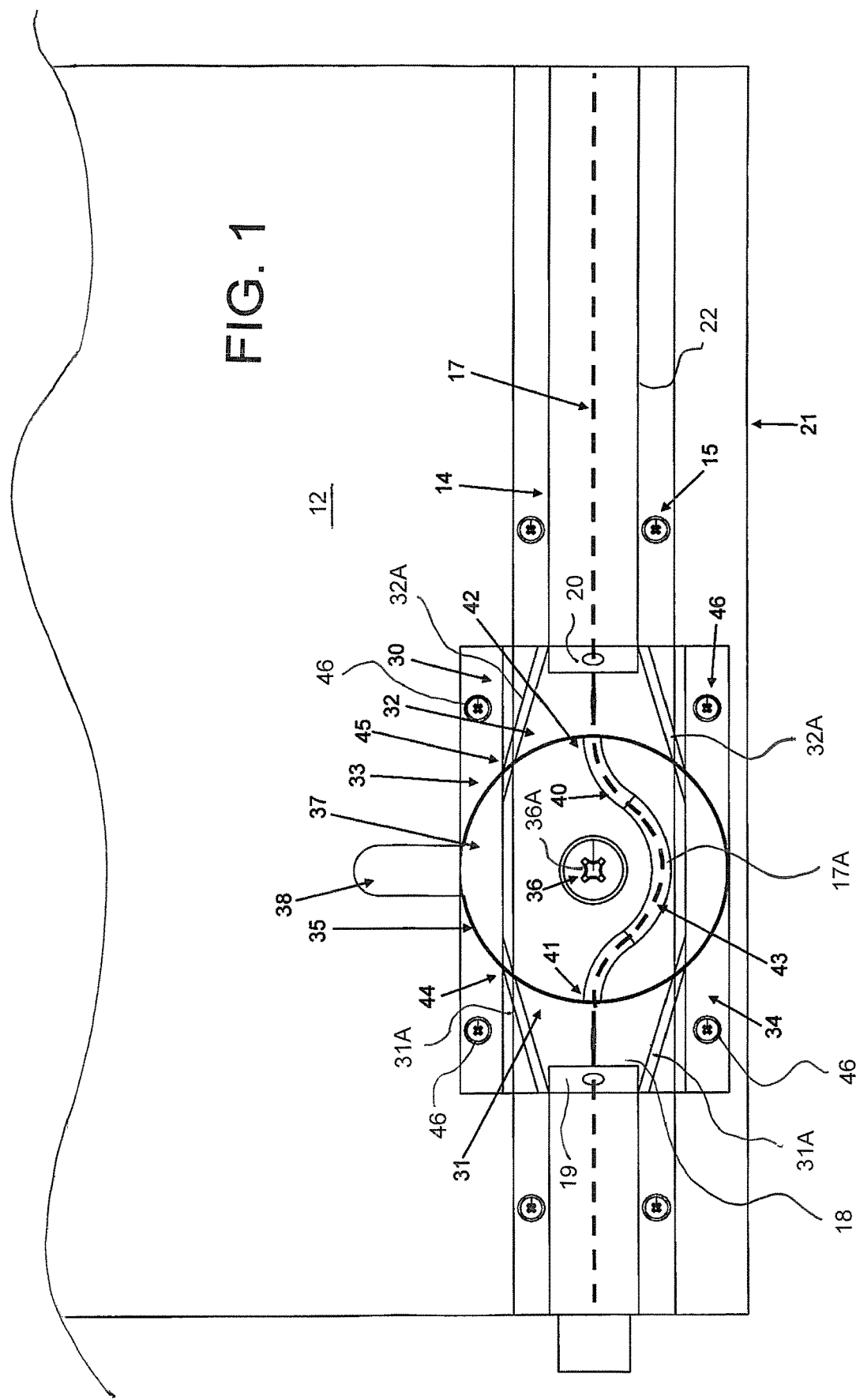
FIG. 1 is an underside view of a device for preventing unauthorized unlocking of a truck box cover according to the present invention mounted on an existing locking arrangement with a conventional cable pull system.
Figure 2:
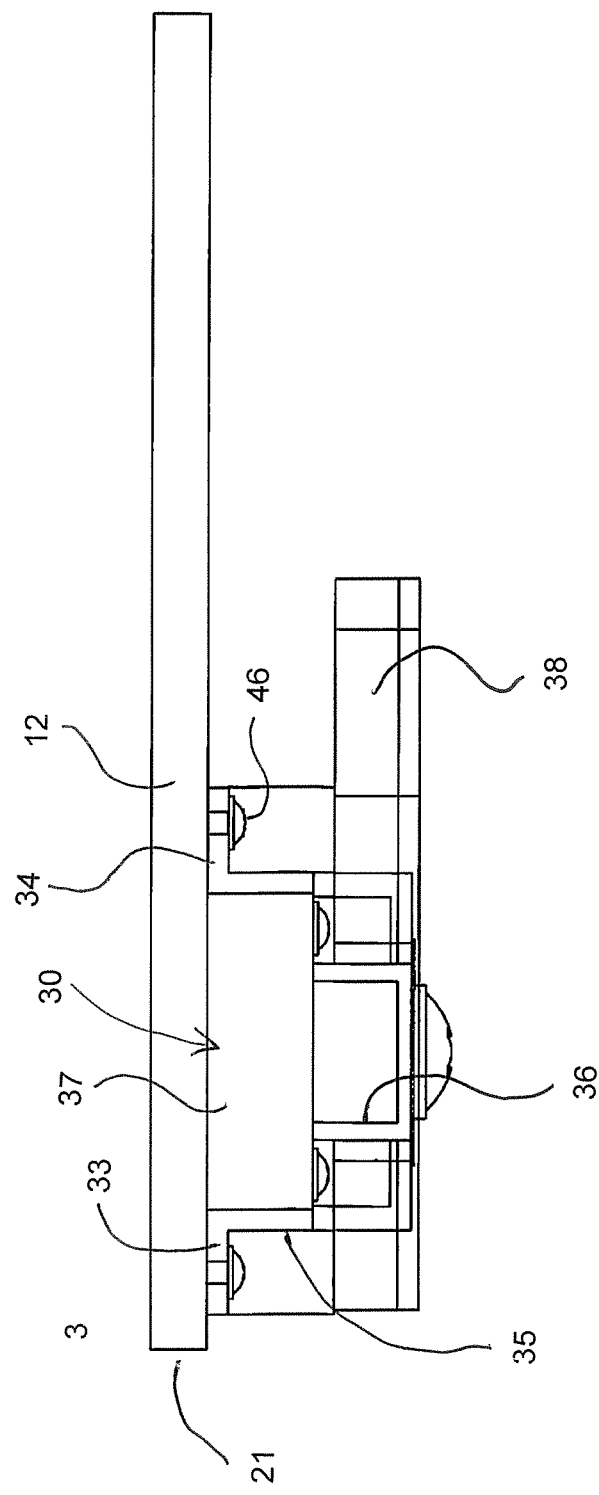
FIG. 2 is an end elevational view of the apparatus of FIG. 1.
Figure 3:
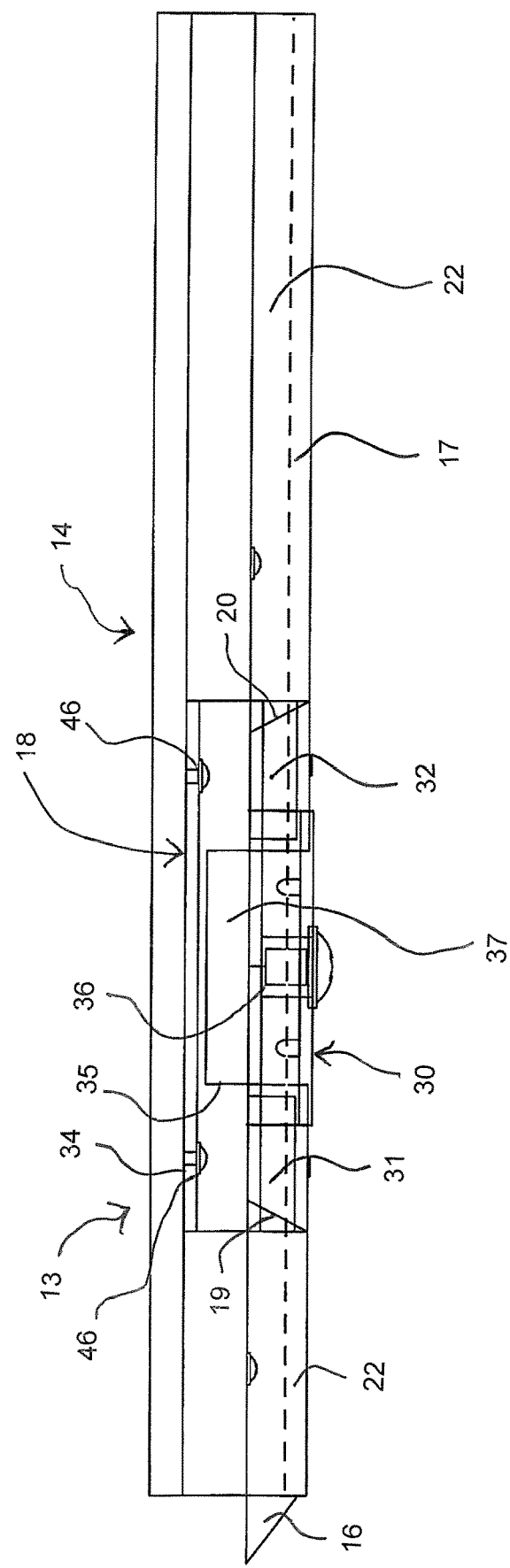
FIG. 3 is a side elevational view of the apparatus of FIG. 1.
Figure 4:
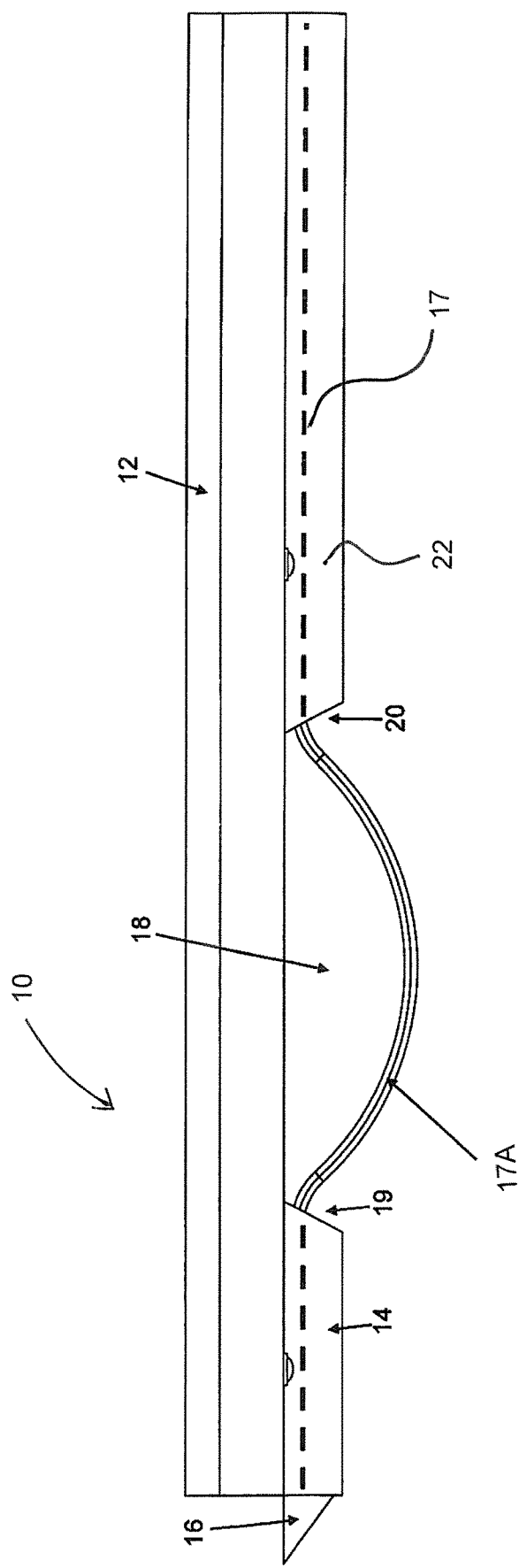
FIG. 4 is a side elevational view of the conventional locking system of FIG. 1 with the apparatus omitted.

In FIGS. 4 and 5 is shown the conventional locking arrangement 10 for a truck cover 11, where the truck cover comprises a cover panel 12 which is arranged to extend over a truck box ((not shown).

A latching device 13 is attached to an underside of the cover panel 12 including a transverse receptacle or channel 14 fastened to the underside of the cover panel 12 by screws 15. The channel 14 extends across the full width of the cover panel so as to define latches 16 at the respective ends for engaging into suitable locations at the truck box side. The channel 14 contains a pull cable 17 attached at each end to a latch projection 16 for engaging a member on the truck box to prevent forward movement of the cover panel relative to the truck box.

The transverse receptacle or channel 14 has an opening 18 between two inclined end walls 19, 20 at which a portion of the cable 17 is exposed to be manually pulled to release the latch projection. The transverse receptacle 14 is located adjacent an end edge 21 of the cover panel 12 with a side 22 of the transverse receptacle 14 facing the end edge 21 and a side 23 facing away from the end edge.

Various mounting arrangements for the receptacle on the cover panel can be provided and these are not shown in detail herein.

The apparatus according to the invention includes a housing 30 shaped to engage over the opening 18 in the transverse receptacle. The housing 30 includes end portions 31 and 32 coupled by flanges 33 and 34 along the sides. The housing defines a cylindrical receptacle 35 and a hub 36 on which an actuator 37 is mounted and rotatable relative thereto about the hub 36 within the cylindrical receptacle 35.

The actuator 37 engages the cable 17 at a portion 17A of the cable within the opening 18 so that rotational movement of the actuator 37 operates to pull the cable 17 to release the latch projection or projections 16 from engagement with the truck box side wall.

The actuator 37 includes a manually operable handle 38 which projects outward from one side of the actuator and is located on the side of the transverse receptacle 14 facing away from the end edge 21 of the cover so as to be inaccessible from the end edge 21.

The housing 30 and the actuator 37 cooperate to cover the opening 18 in the transverse receptacle 14 so as to prevent direct access to the cable 17 and thereby prevent unauthorized release of the latch projection by pulling of the cable 17.

The transverse receptacle or channel 14 in some embodiments has two openings at which the cable 17 is exposed and the apparatus includes two housings 30 and two actuators 37 at positions spaced across the cover panel each for engaging over a respective opening 18 adjacent a respective side of the truck box.

The actuator 37 mounted on the hub 36 rotates about axis at right angles to the cover panel operated by the manually operable member or handle lever 38 which extends rearwardly away from the end edge 21.

In this way, the manually operable handle 38 is located such that it becomes accessible only from underneath the cover panel when the tailgate is opened. The requirement to rotate the handle 38 about the vertical axis of the hub 36 also makes it very difficult or impossible to reach around or over the channel 14 to access and pull the handle 38 to pull the cable 17.

The loose portion 17A of the cable 17 at the opening 18 is inserted into a center part of the actuator 37 so that the actuator 37 includes a guide channel 40 extending from one end 41 at one side of the actuator 37 to the opposed side 42 into which the cable is inserted. Thus the guide channel 40 has ends 41 and 42 lying on a path of the cable 14 in the track 14 and a center portion 43 which extends to one side of a center axis 36A of the hub 36 of the actuator so as hold the cable 17 taut. That is the length of the guide channel 40 is greater than the straight line between the ends 41 and 42 so that the loose portion 17A of the cable 17 within the opening 18 is held fixed in the guide channel 40 in the actuator 37 which lies in a common plane parallel to the cover with the transverse receptacle and the cable contained therein.

The housing 30 includes a cable engagement portion 31 and 32 at each end which holds the cable fixed on each side of the actuator. Thus the portions 31 and 32 includes sides 31A and 32A just cover the inclined end walls 19 and 20 and diverge outwardly therefrom to the cylindrical receptacle 35 at 44 and 45.

The housing 30 is fastened to the cover panel along the flanges 33 and 34 by screws 46 at sides of the transverse receptacle 14. Thus the housing extends over and bridges the transverse receptacle 14 to cover the full area at the opening 18 so that no part of the portion 17A of the cable 17 is accessible at the opening. Also the remainder of the cable 17 is covered by the existing channel or track 14 so that the cable is inaccessible at other locations where the cable is contained within the channel 14. This arrangement where the housing 30 bridges the existing system allows it to be applied over the existing locking system without any modification or removal. This device can therefore be sold as an accessory to be applied onto existing equipment as an additional security device.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for locking a truck cover against unauthorized release, where the truck cover comprises:

a cover panel which is arranged to extend over a truck box up to a tailgate of the truck box and which can move from a closed position at the tailgate away from the tailgate;

and a latching device attached to an underside of the cover panel including a transverse receptacle containing a pull cable attached to at least one latch projection for engaging a side member on the truck box to prevent movement of the cover panel relative to the truck box from the closed position, the transverse receptacle having an opening at which a portion of the cable is exposed to be manually pulled to release said at least one latch projection, the transverse receptacle being located adjacent a rear edge of the cover panel with a side of the transverse receptacle facing away from the rear edge;

the apparatus comprising:

a housing shaped to engage over the opening in the transverse receptacle;

an actuator mounted on the housing and movable relative thereto;

the actuator engaging the cable so that movement of the actuator operates to pull the cable to release said at least one latch projection;

the actuator including a manually operable member located such that it becomes accessible only from underneath the cover panel when the tailgate is opened;

the housing and the actuator cooperating to cover the opening in the transverse receptacle so as to prevent direct access to the cable and thereby prevent unauthorized release of the latch projection by pulling of the portion of the cable.

2. The apparatus according to claim 1 wherein the actuator includes a manually operable handle which is located on the side of the transverse receptacle facing away from the rear edge.

3. The apparatus according to claim 1 wherein the transverse receptacle has two openings at which portions of the cable are exposed and wherein the apparatus includes two housings each for engaging over a respective opening.

4. The apparatus according to claim 1 wherein there are provided two latch projections each at a respective end of the transverse receptacle for engaging respective sides of the truck box with each latch portion being operable by the cable.

5. The apparatus according to claim 1 wherein the actuator is mounted for rotation to pull the portion of the cable.

6. The apparatus according to claim 5 wherein the actuator rotates about an axis at right angles to the cover panel.

7. The apparatus according to claim 1 wherein the manually operable member comprises a handle lever which extends forwardly away from the rear edge.

8. The apparatus according to claim 1 wherein the actuator includes a guide channel into which the portion of the cable is inserted.

9. The apparatus according to claim 8 wherein the guide channel has ends lying on a path of the cable and a center portion which receives the portion of the cable and extends to one side of a center axis of the actuator so as hold the cable taut.

10. The apparatus according to claim 8 wherein the cable guide channel lies in a common plane with the transverse receptacle parallel to the cover.

11. The apparatus according to claim 1 wherein the housing includes a cable engagement portion which holds the cable fixed on at least one side of the actuator.

12. The apparatus according to claim 1 wherein housing includes two cable engagement portions each on a respective side of the actuator which holds the cable fixed on the side of the actuator.

13. The apparatus according to claim 1 wherein housing is fastened to the cover panel at sides of the transverse receptacle so as to extend over the transverse receptacle.

14. The apparatus according to claim 1 wherein ends of the housing engage over and cover ends of the transverse receptacle at the opening.

15. A truck cover comprising:
a cover panel which is arranged to extend over a truck box up to a tailgate of the truck box and which can move from a closed position at the tailgate away from the tailgate;
a latching device attached to an underside of the cover panel including:
a transverse receptacle containing a pull cable;
to at least one latch projection attached to the pull cable for engaging a side member on the truck box to prevent movement of the cover panel relative to the truck box from the closed position,
the transverse receptacle having an opening at which a portion of the cable is exposed to be manually pulled to release said at least one latch projection;
the transverse receptacle being located adjacent a rear edge of the cover panel with a side of the transverse receptacle facing away from the rear edge;
and an apparatus for locking the truck cover against unauthorized release comprising:
a housing shaped to engage over the opening in the transverse receptacle;
an actuator mounted on the housing and movable relative thereto;
the actuator engaging the cable so that movement of the actuator operates to pull the cable to release said at least one latch projection;
the actuator including a manually operable member located such that it becomes accessible only from underneath the cover panel when the tailgate is opened;
the housing and the actuator cooperating to cover the opening in the transverse receptacle so as to prevent direct access to the cable and thereby prevent unauthorized release of the latch projection by pulling of the portion of the cable.

16. The truck cover according to claim 15 wherein the actuator includes a manually operable handle which is located on the side of the transverse receptacle facing away from the rear edge.

17. The truck cover according to claim 15 wherein the transverse receptacle has two openings at which portions of the cable are exposed and wherein the apparatus includes two housings each for engaging over a respective opening.

18. The truck cover according to claim 15 wherein there are provided two latch projections each at a respective end of the transverse receptacle for engaging respective sides of the truck box with each latch portion being operable by the cable.

19. The truck cover according to claim 15 wherein the actuator is mounted for rotation to pull the portion of the cable.

20. The truck cover according to claim 19 wherein the actuator rotates about an axis at right angles to the cover panel.

* * * * *